Figure 1:
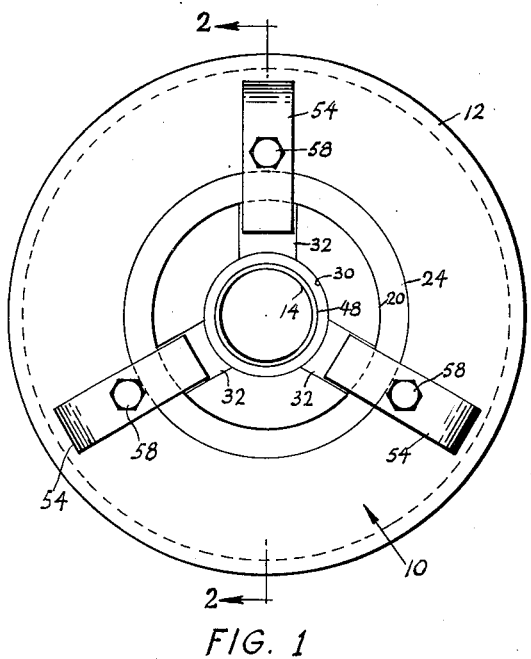

Dec. 31, 1957   M. HUTTERER   2,818,283
HOUSING ATTACHED SEALING UNIT WITH RESILIENTLY
PRESSED SEALING LIPS
Filed Feb. 16, 1955

INVENTOR.
MARTIN HUTTERER
BY
Jerome Bauer
ATTORNEY

United States Patent Office 2,818,283
Patented Dec. 31, 1957

2,818,283

HOUSING ATTACHED SEALING UNIT WITH RESILIENTLY PRESSED SEALING LIPS

Martin Hutterer, Brooklyn, N. Y., assignor to Cummings-Landau Laundry Machinery Company, Inc., Brooklyn, N. Y., a corporation of New York Application February 16, 1955, Serial No. 488,619

2 Claims. (Cl. 286—8)

This invention relates to improvements in the construction and operation of washing and laundry machines but more particularly it relates to a sealing device therefor.

A problem with which the laundry and dry cleaning industry is concerned is the loss of fluid, and in washing machines, namely, the washing water which escapes from between the frame of the machine and about the cylinder shafts extending from the same at the ends thereof. Prior attempts made toward the elimination of this problem by precision turning of the cylinder shafts after they have been secured to the cylinder have proven expensive. Attempts to successfully mount precision made seals between the shafts and the respective ends of the frame through which the shafts project, have proved unfruitful since any eccentric or non-precision rotation of the shafts and/or corrosion of the parts included in the sealing area overcomes the purpose of the precision made seals and results in the seepage of water from the frame and around the shaft. Hence, operation of the machine only tends to destroy the seals thereabout, to the extent that the seepage rapidly turns into a leaking rivulet exuding washing fluid with each pumping revolution of the washing cylinder.

This invention is directly concerned with the aforementioned problem and has as its object the provision of a novel sealing device which, when once secured in position about a shaft and to a stationary member, remains unaffected by the eccentric rotation or run-out of the shaft. Accordingly, a feature of the invention resides in the details of construction of the novel sealing device which eliminates the need for precision made elements and for precision centering of the sealing device about the shaft and to the stationary frame member as is necessary in hitherto known seals.

Another object of the invention is to provide a sealing device in which the essential elements thereof are not subject to corrosion, and has as a feature thereof the provision of pliable, resilient means about the shaft to permit the eccentric rotation or run-out of the same, yet to maintain a fluid-tight seal thereabout. Accordingly, the rugged construction of the novel sealing device results from the elimination and conspicuous absence of precision elements.

A further object of the invention is to provide a sealing device which is simple in construction, economical in manufacture, readily and easily installed and replaced, and efficient and long-lasting in operation.

Figure 2:
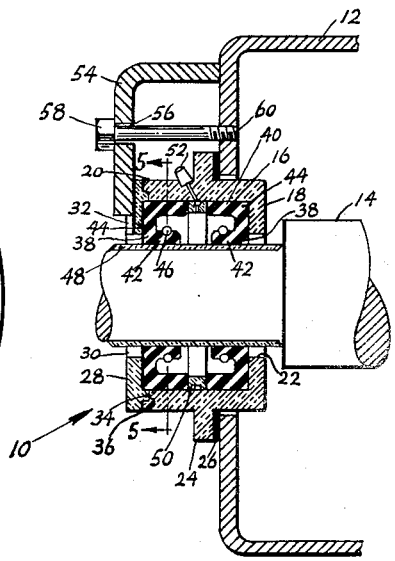
Figure 3:
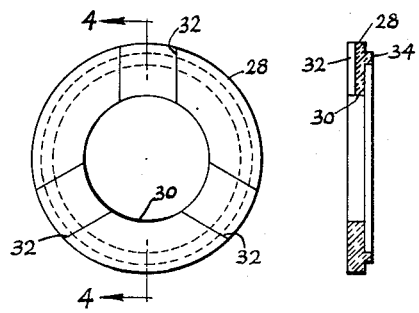
Figure 4:
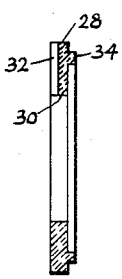
Figure 5:
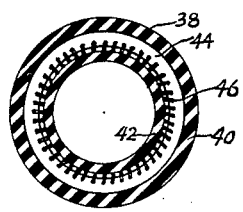

Other and further objects of my invention reside in the structures and arrangements hereinafter more fully described with reference to the accompanying drawings in which:

Fig. 1 is an elevational view of the novel sealing device constructed in accordance with the invention and secured in position between the laundry machine frame and shaft, Fig. 2 is a side elevation in section of the novel sealing device shown in Fig. 1 and taken along lines 2—2 thereof, Fig. 3 is an elevational view of the cover for the housing of the novel sealing device, Fig. 4 is a sectional side elevation of the cover shown in Fig. 3 taken along lines 4—4, and Fig. 5 is a sectional front view of one of the seal rings of the novel sealing device taken along lines 5—5 of Fig. 2.

Referring now to the drawings, the novel sealing device is generally identified by the numeral 10 and is adapted to be utilized in commercial laundry or dry cleaning machines wherein it is necessary to seal a space in the machine between the frame 12 thereof and the shaft 14 of the cylinder (not shown) of the machine. Inasmuch as the structural details of neither the laundry machine frame 12 nor the cylinder in which the articles are to be washed form any part of the invention, other than that the space therebetween is closed fluid tightly by the novel sealing device, a more detailed discussion of the same would only tend to obscure rather than define the invention. For the purposes of description and a better understanding of the invention, suffice it to note that the shaft 14 is secured to a washing cylinder of the laundry machine.

The sealing device 10 comprises a circular non-corrosive housing 16 having a radially extending wall 18 and an axially extending wall 20. The wall 18 has an opening 22 defined therein, through which the shaft 14 extends. Opening 22 is sufficiently large in dimension to accommodate the shaft 14 during the "runout" or eccentric rotation of the same, so that the radially inner edge of the wall 18 is radially spaced from the shaft at all times. Provided along the outer periphery of the housing 16 there is a portion 24 which is adapted to cooperate with the frame 12 to secure therebetween a seal or fluid tight gasket ring 26 in a manner and for a purpose which will become obvious as the description proceeds.

Included in the housing structure 16 is a non-corrosive cover 28. The cover 28 (see Figs. 3 and 4) and the housing 16 may be cast from bronze and may have an opening 30 defined therein which, like the opening 22, is sufficiently large in dimension to accommodate the end of the shaft 14, during eccentric rotation thereof without, however, coming in contact with the same. The cover 28 has a plurality of notches or grooves 32 provided in its outer face for a purpose to be described. A circular ridge or tongue 34 is provided on the inner face of the cover 28 and is spaced from the radial edges thereof to congruously cooperate with an undercut surface 36 provided in the housing 16 (see Fig. 2).

Included within the housing 16 of the sealing device 10 are circular or ring-shaped sealing means 38, better seen in Figs. 2 and 5. Each of the sealing means 38 are made of a pliant or plastic material, for example, rubber, and are substantially U-shaped in cross section. In Figs. 2 and 5 of the drawings the pair of seal members 38 are shown to be identical in construction thus a description of one will suffice for both. The seal member 38 has an upper or axial outer shoulder portion 40 and a lower or axial inner lip 42 radially spaced from each other but interconnected with each other by a body portion 44. Each of the sealing members 38 has a groove (not numbered) in the lip 42 in which a garter or coil spring, or other resilient means 46 is seated to urge the same into resilient engagement with a non-corrosive shaft sleeve 48. The sleeve 48 is secured to the outer periphery of the portion of the shaft 14 about which the sealing device 10 normally extends. The sleeve 48, like the housing 16 and the cover 28, may be a bronze casting machined to provide a smooth running surface for the spaced axially extending engaging portions of the lips 42 of the sealing members 38.

It will be noted from the drawings that the sealing members 38 are each separated from the other and in the preferred embodiment shown in the drawings they are positioned in opposed facing relationship, whereby the edge of the lip 42 on one of the members 38 faces the edge of the lip 42 on the other member 38. The members 38 are spaced from each other by a separator ring 50 which is also composed of a non-corrosive material, for example, bronze. The ring 50 serves not only to separate the lips 42, but also serves to enable lubrication of the coacting surfaces on both the lips and the shaft sleeve 48. Hence to accomplish its intended purpose the ring 50 has a lubricating fitting, cooperating peripheral groove and communicating hole all identified by the numeral 52 to conduct lubricants to the necessary surfaces and between the sealing members 38.

In operation, when the lubricant is forced into the fitting, peripheral groove, hole 52 and thence into the space between the members 38, it is retained therein by the members. At the same time, however, the lubricant applies an additional force about the lips 42 to urge the same into engagement with the periphery of the shaft 14. In this regard it will be recognized that the lubricant retained between the sealing members 38 increases the sealing effect of the device 10.

In the drawings, more especially in Fig. 1, it will be noted that three clamps 54 are provided, each to cooperate with a groove 32 in the face of the cover 28 to securely retain the cover on the housing and the housing positioned with respect to the frame 12. Obviously, the number of clamps 54 and cooperating grooves 32 may be varied. The clamps 54 are substantially L-shaped, and have an opening 56 through which a bolt 58 is adapted to extend, to be threaded into a corresponding opening 60 in the frame 12.

With the clamp 54 positioned with one of its legs seated in the groove 32, and with its other leg standing against the frame 12, as the bolt 58 is threaded into its corresponding threaded opening 60 in the frame 12, the cover 28 will be secured to the housing 16 and the gasket 26 will be clamped between the portion 24 of the housing and the frame 12 to provide a fluid tight seal therebetween. It is believed that the operation of the sealing device is obvious from the foregoing description. However, it will be readily recognized that when the seal 10 is positioned about the shaft 14 it need not necessarily be centered with precision relative to the shaft or relative to the frame 12. In fact it will be noted from the drawings, and more particularly from Fig. 2, that the openings 22 and 30 of the sealing device 10 are sufficiently large to be amply free of the shaft 14. Similarly, the opening in the frame 12 and into which a portion of the housing 16 extends is also of no import other than that it will be large enough to accommodate the housing. Misalignment of the parts is of no consequence since any misalignment which may occur will be compensated for by the resilient engagement of the lips 42 with the sleeve 48.

Naturally, when the novel sealing device 10 is clamped in position relative to the frame 12, an attempt is made to center it about the shaft 14 as accurately as possible. However, a precise degree of accurate centering is unnecessary and obviated by the novel construction of the instant invention. The parts of the sealing device 10 are merely applied about the shaft 14 and the sleeve 48 and then securely clamped relative to the frame 12 by the clamps 54. There are no screws to be threaded, no corrosive parts to replace and no precision parts to center.

Understandably, an attempt is made to securely affix the shaft 14 to its cylinder (not shown) with a reasonable degree of care so that the same will rotate as concentrically as is possible under the circumstances. But, inasmuch as the novel sealing device 10 operates when the shaft 14 is rotating both concentrically and eccentrically, the shaft need not be secured to its cylinder with any degree of precision nor need the ends of the cylinder be exactly in parallel relationship. Hence, the expensive tools and time consumed in "trueing" the shaft 14 on its cylinder as required by prior art sealing devices is now entirely eliminated.

Any stresses applied to the shaft 14 which might cause the same to further "runout" or rotate eccentrically will be compensated for by the relationship of the pliable lips 42 on each of the members 38, and further, by the resilient engagement of the lips with the sleeve 48. After having been clamped into position relative to the frame 12, the novel sealing device 10 will continue to provide a secure fluid tight non-corrosive connection between the frame 12 and the shaft 14. The obvious elimination of connecting screws normally required to retain the cover to the housing 12, or the obvious elimination of the presence of other corrosive elements, provides a seal which is rugged in construction and free from damage as a result of corrosion.

Although I have described a combinational cooperation between my sealing device 10 and the non-corrosive shaft sleeve 48, housing 16 and cover 28, in practice and under varied applications, the novel sealing device has functioned successfully without the combination of the non-corrosive parts. Hence, at times when a non-corrosive washing fluid is used it may be desirable to eliminate the sleeve 48 and permit the lips 42 to resiliently engage the shaft 14 directly and further to provide a housing and cover which need not be of non-corrosive materials. In certain applications when the sleeve 48 is eliminated and a corrosive fluid is used the shaft may be constructed either of a non-corrosive material or it may be provided with a non-corrosive plating finish or film.

Although it will be clear from the foregoing that I have provided a device which is made applicable to laundry machines wherein the cylinder shaft runs-out or rotates eccentrically, it will be recognized that the same may be similarly employed in other structures faced with the same or similar problems.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A sealing device cooperable with a frame and an eccentrically rotatable shaft to seal a space therebetween comprising: a housing including an axial wall radially spaced from and extending about said shaft, a portion of said housing cooperable with said frame and a radial wall at each end of said axial wall, at least one of said radial walls having an opening defined therein, said opening being larger than the diameter of said shaft to accommodate the same during eccentric rotation thereof, gasket means between said cooperable portion of said housing and said frame to provide a fluid tight seal, seal rings in said housing, said rings each including a shoulder, a lip radially spaced from said shoulder and a body interconnecting said lip and shoulder, said shoulder on each of said seal rings being supported along portions of said axially extending wall, said lips on said seal rings extending along axial portions of the eccentrically rotatable shaft, spring means cooperating with the lips of each of said seal rings to resiliently retain the same in fluid tight engagement with said shaft, said radial walls supporting each of said seal rings along their respective interconnecting bodies, spacer means between said seal rings to space the same from each other, clamp means having legs cooperating with one of said radial walls of said housing and with said frame to secure the housing relative to said frame from the outside of the latter while said cooperating portion on said housing is held relative to said frame with said gasket means therebetween, and means threadably cooperating with said frame and clamp means to secure said legs against said frame and said one radial wall of the housing respectively.

2. A sealing device as in claim 1, one of said radial walls being a cover removable from said housing to provide access to the seal rings therein, said cover having an opening defined therein, said defined opening being larger than the diameter of said shaft to accommodate the same during eccentric rotation thereof, and means on said cover cooperating with said clamp means to locate the housing relative to the frame.

References Cited in the file of this patent

UNITED STATES PATENTS

| | | |
|---|---|---|
| 1,366,219 | Sudekum | Jan. 18, 1921 |
| 2,126,366 | Boyer | Aug. 9, 1938 |
| 2,291,248 | Myers | July 28, 1942 |

FOREIGN PATENTS

| | | |
|---|---|---|
| 835,097 | Germany | Mar. 27, 1952 |